Patented Aug. 16, 1932

1,872,030

UNITED STATES PATENT OFFICE

HENRY DREYFUS, OF LONDON, ENGLAND

MANUFACTURE OF ALIPHATIC ANHYDRIDES

No Drawing. Application filed March 8, 1929, Serial No. 345,449, and in Great Britain March 27, 1928.

This invention relates to the manufacture of aliphatic anhydrides from aliphatic acids, and especially to the manufacture of acetic anhydride from acetic acid.

According to the invention I have now found that aliphatic anhydrides (and especially acetic anhydride) may readily be produced by subjecting to thermal decomposition, i. e. to the action of high or relatively high temperatures, aliphatic acid vapour (and especially acetic acid vapour) in admixture with one or more hydrohalide acids, namely hydrochloric acid, hydrobromic acid, hydriodic acid or mixtures of such acids.

While I preferably employ mixtures of acetic or other aliphatic acid vapour and the hydrohalide acid or acids containing upwards of about 5% of the hydrohalide acid or acids,—and especially mixtures containing substantially one molecular equivalent of the hydrohalide acid or acids relatively to two molecular equivalents of the aliphatic acid (reckoning the hydrohalide acid as monomolecular)—it is to be understood that I may employ mixtures containing even such small quantities of hydrohalide acid or acids as about 2%.

The reaction may be performed at temperatures of from about 100° C. to 900° C. and preferably at temperatures of from about 200° C. to 600° C. The reaction may if desired be performed in presence of filling or contact materials such for example as Carborundum, pumice, kieselguhr or the like.

In performing the invention I may for instance pass the mixture of the hydrohalide acid or acids and the aliphatic acid vapour through fireclay, fused silica or other tubes or other form of apparatus heated to the desired temperature, which apparatus may if desired be filled or provided with contact or filling materials. For example, I may pass through said heated tubes or apparatus, a mixture containing about 70 parts of acetic acid and about 1 to 50 parts of hydrochloric acid.

The mixtures of the aliphatic acid vapour and the hydrohalide acid or acids may of course be made in any suitable way. For instance, they may be made by simple admixture of the vapours of the aliphatic acid and of the hydrohalide acid or acids. Or, for instance, the vapour of the hydrohalide acid or acids may be passed in a stream through boiling acetic (or other aliphatic) acid, the stream of hydrohalide acid vapour being regulated to ensure the desired composition of the resulting vapour mixture.

Instead of passing a mixture of the aliphatic acid vapour and the hydrohalide acid or acids through the heated tubes or other form of apparatus, I may, for instance, introduce or inject into the heated tubes or apparatus the liquid aliphatic acid containing the hydrohalide acid or acids in the beforementioned quantities.

Further instead of the free hydrohalide acids, I may employ for the execution of the invention substances which are capable of yielding hydrohalide acid by reaction with aliphatic acids or under the action of heat. As examples of such substances may be mentioned zinc chloride, magnesium chloride, stannic chloride, calcium chloride. For instance, I may introduce or inject into the hot reaction zone a mixture containing the aliphatic acid and the zinc chloride or stannic chloride (or other substances of the character referred to) in the desired proportions.

The anhydride produced by the process may be separated or recovered from the reaction gases or vapours in any suitable way. The reaction gases or vapours may, if desired, be passed over or otherwise in contact with sodium or other acetate, prior to the separation or recovery of the anhydride, in order to neutralize as far as possible the hydrohalide acid or acids; such treatment of the reaction gases or vapours may also serve to decompose acylhalide present. If desired, however, the anhydride may be recovered or separated from the reaction gases without first passing them in contact with sodium acetate or other acetate. The anhydride recovered or separated from the reaction gases or vapours may if desired or required be purified by any suitable means. For instance, it may be distilled from or otherwise treated with anhydrous sodium acetate or other acetate to remove any acylchloride or hydrohalide acid.

In the recovery or separation of the anhydride from the reaction vapours the reaction gases or vapours are preferably not submitted to simple condensation, as such condensation involves hydrolysis and consequent loss of the anhydride, but they are preferably treated to separate the anhydride from the water vapour present or formed in the reaction. For instance, the gases or vapours from the reaction zone may, if desired, after passing over or otherwise in contact with sodium or other acetate, be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction vapours may, if desired, after passing over or otherwise in contact with sodium or other acetate, be passed through one or more solvents for the anhydride which are insoluble or substantially insoluble in water and of higher boiling point than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzylether, tetrachlorethane, paraffin oil, triacetin, phenetol, anisol, one or more cresols and paracresyl acetate.

Or, for instance, the reaction vapours may, if desired, after passing over or otherwise in contact with sodium or other acetate be subjected to condensation by the process described in the United States patent application of myself and C. I. Haney S. No. 284,566, filed 11 June 1928, that is to say I may condense the anhydride from the reaction vapours whilst carrying away the water vapour by the vapour of one or more entraining liquids. In such form of execution the reaction vapours are preferably mixed after leaving the reaction zone (and preferably after passing in contact with sodium acetate or other acetate), with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether with petroleum ether; it will be understood, however, that any other liquids chemically inert to the anhydride and having a high entraining capacity for water may be employed. The liquids should preferably have a low entraining capacity for the anhydride.

Or, again, for instance, the reaction vapours may, if desired, preferably after passing over or otherwise in contact with sodium or other acetate, be subjected to condensation by the process described in the United States patent application of myself and C. I. Haney S. No. 285,613 filed 15 June 1928, that is to say they may be subjected to condensation by leading them under the surface of an "extracting" liquid cooled down or otherwise kept at temperatures below (and preferably considerably below) the boiling point of water. By the term "extracting" liquid is meant a liquid or liquid mixture which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or again, for instance, the reaction vapours may be treated by the process described in my U. S. Patent Application S. No. 242,977 filed 27 December, 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and the resulting risk of loss of anhydride through hydrolysis, and for the best functioning of the treatment the water binding substances should be employed at temperatures above the boiling point of the anhydride in which case the water can be substantially absorbed and the anhydride pass on in vapour form. The term "water binding" substance means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

The following example serves to illustrate a convenient method of execution of the invention it being understood that it is given solely by way of illustration and is in no way limitative.

*Example*

A mixture of acetic acid vapour and hydrogen chloride containing about two molecular equivalents of acetic acid relatively to each molecular equivalent of hydrogen chloride (i. e. about 120 parts by weight of acetic acid and about 36 parts by weight of hydrogen chloride) is passed in a rapid stream through a fireclay or silica tube heated to a temperature between 500° and 600° C. The resulting gases or vapours are passed over sodium acetate kept at a convenient temperature above the boiling point of acetic anhydride (e. g. at a temperature between 150° and 250° C.) in order to free the gases or vapours from hydrogen chloride as far as possible. After passing over the sodium acetate the gases or vapours are caused to pass upwards through one or more fractionating columns maintained at a temperature or temperatures intermediate between the boiling point of the anhydride and of water whereby the anhydride is condensed and the water kept in vapour form.

What I claim and desire to secure by Letters Patent is:—

1. In a process for the manufacture of an aliphatic anhydride by the thermal decomposition of the corresponding aliphatic acid the step which comprises effecting the reaction in the presence of at least one hydro-halide acid as catalyst.

2. In a process for the manufacture of an aliphatic anhydride by the thermal decomposition of the corresponding aliphatic acid the step which comprises effecting the reaction in the presence of hydrochloric acid as catalyst.

3. In a process for the manufacture of an aliphatic anhydride by the thermal decomposition of the corresponding aliphatic acid the step which comprises effecting the reaction in the presence of between 1 and 50 parts of hydro-halide acid as catalyst to each 70 parts of aliphatic acid vapor.

4. In a process for the manufacture of an aliphatic anhydride by the thermal decomposition of the corresponding aliphatic acid the step which comprises effecting the reaction in the presence of between 1 and 50 parts of hydrochloric acid as catalyst to each 70 parts of aliphatic acid vapor.

5. Process for the manufacture of an aliphatic anhydride which comprises subjecting aliphatic acid vapor in admixture with at least one hydro-halide acid to thermal decomposition at a temperature between 100° and 900° C.

6. Process for the manufacture of an aliphatic anhydride which comprises subjecting aliphatic acid vapor in admixture with at least one hydro-halide acid to thermal decomposition at a temperature between 200° and 600° C.

7. Process for the manufacture of an aliphatic anhydride which comprises subjecting aliphatic acid vapor in admixture with hydrochloric acid to thermal decomposition at a temperature between 200° and 600° C.

8. Process for the manufacture of an aliphatic anhydride which comprises subjecting a mixture of 70 parts of aliphatic acid vapor and between 1 and 50 parts of hydrochloric acid vapor to thermal decomposition at a temperature between 200° and 600° C.

9. Process for the manufacture of acetic anhydride which comprises subjecting acetic acid vapor in admixture with at least one hydro-halide acid to thermal decomposition.

10. Process for the manufacture of acetic anhydride which comprises subjecting acetic acid vapor in admixture with hydrochloric acid to thermal decomposition.

11. Process for the manufacture of acetic anhydride which comprises subjecting a mixture of 70 parts of acetic acid vapor and between 1 and 50 parts of hydro-halide acid to thermal decomposition.

12. Process for the manufacture of acetic anhydride which comprises subjecting a mixture of 70 parts of acetic acid vapor and between 1 and 50 parts of hydrochloric acid to thermal decomposition.

13. Process for the manufacture of acetic anhydride which comprises subjecting acetic acid vapor in admixture with at least one hydro-halide acid to thermal decomposition at a temperature between 200° and 600° C.

In testimony whereof I have hereunto subscribed my name.

HENRY DREYFUS.